United States Patent
Harumoto et al.

(10) Patent No.: US 6,563,984 B1
(45) Date of Patent: May 13, 2003

(54) LONG-PERIOD GRATING DEVICE

(75) Inventors: Michiko Harumoto, Yokohama (JP);
Masakazu Shigehara, Yokohama (JP);
Shinji Ishikawa, Yokohama (JP);
Tadashi Enomoto, Yokohama (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 0 days.

(21) Appl. No.: 09/504,898

(22) Filed: Feb. 16, 2000

(30) Foreign Application Priority Data

Feb. 17, 1999 (JP) ............................................. 11-038840

(51) Int. Cl.[7] .............................. G02B 6/26; G02B 6/34
(52) U.S. Cl. ........................................... 385/37; 385/28
(58) Field of Search ............................. 385/28, 29, 37, 385/124, 27, 31

(56) References Cited

U.S. PATENT DOCUMENTS

| | | | |
|---|---|---|---|
| 5,703,978 A | | 12/1997 | Digiovanni et al. |
| 5,732,170 A | * | 3/1998 | Okude et al. ................. 385/27 |
| 5,764,829 A | * | 6/1998 | Judkins et al. .............. 359/179 |
| 6,253,008 B1 | * | 6/2001 | Harumoto et al. ............ 385/37 |

FOREIGN PATENT DOCUMENTS

JP          9-236720        9/1997

OTHER PUBLICATIONS

"Dependence of Transmission Characteristics of Long–Period Fiber Grating on Tension", M. Harumoto et al., Technical Report of IEICE, OFT98–9, (Apr. 1998), pp. 47–51.

"Long–period fiber gratings as band–rejection filters", A. Vengsarkar et al., OFC'95, PD4, pp. 2–5.

"Reduction of Ripple in Transmission Characteristics of Long–Period Grating", M. Harumoto et al., 1998, p. 184.

"Long–Period Fiber Gratings as Band–Rejection Filters", A. Vengsarkar et al., Journal of Lightwave Technology, vol. 14, No. 1, Jan. 1996, pp. 58–65.

\* cited by examiner

Primary Examiner—Hemang Sanghavi
Assistant Examiner—Omar Rojas
(74) Attorney, Agent, or Firm—McDermott, Will & Emery

(57) ABSTRACT

The present invention relates to a long-period grating device which eliminates only a desirable wavelength of core-mode light in a wavelength band in use from 1525 nm to 1610 nm. The long-period grating device according to the present invention comprises an optical fiber provided with a core region and a cladding region, whereas a long-period grating whose refractive index changes with a period $\Lambda$ in the advancing direction of light is provided in the core region, wherein the period $\Lambda$ is set such that the absolute value of a loss peak due to mode coupling concerning a refractive index modulation component with a period $\Lambda/(2n+1)$ (n=1, 2, 3, 4) is 0.2 dB or less in the wavelength band in use.

2 Claims, 8 Drawing Sheets

| WAVELENGTH (nm) | $\beta_{co}(\mu m^{-1})$ | $\beta_{cl}^{(4)}(\mu m^{-1})$ | $\beta_{cl}^{(21)}(\mu m^{-1})$ | $\beta_{cl}^{(22)}(\mu m^{-1})$ | $\beta_{cl}^{(23)}(\mu m^{-1})$ |
|---|---|---|---|---|---|
| 1545 | 5.882495 | 5.869014 | 5.771873 | 5.762106 | 5.751881 |
| 1546 | 5.878617 | 5.865164 | 5.767957 | 5.758183 | 5.747951 |
| 1547 | 5.874743 | 5.861318 | 5.764046 | 5.754265 | 5.744026 |
| 1548 | 5.870875 | 5.857478 | 5.760139 | 5.750352 | 5.740106 |
| 1549 | 5.867012 | 5.853642 | 5.756238 | 5.746444 | 5.736191 |
| 1550 | 5.863154 | 5.849812 | 5.752341 | 5.742541 | 5.732280 |
| 1551 | 5.859301 | 5.845986 | 5.748450 | 5.738642 | 5.728375 |
| 1552 | 5.855453 | 5.842165 | 5.744563 | 5.734749 | 5.724475 |
| 1553 | 5.851609 | 5.838349 | 5.740681 | 5.730861 | 5.720579 |
| 1554 | 5.847771 | 5.834538 | 5.736804 | 5.726977 | 5.716689 |
| 1555 | 5.843938 | 5.830732 | 5.732932 | 5.723098 | 5.712803 |

LONG-PERIOD GRATING DEVICE

BACKGROUND OF THE INVENTION

1. Field of the Invention

The present invention relates to a long-period grating device which generates mode coupling between core-mode light and cladding-mode light at a predetermined wavelength in a wavelength band in use.

2. Related Background Art

A long-period grating device is an optical device in which an area whose refractive index periodically changes in the advancing direction of light is formed in a part of an optical waveguide such as an optical fiber. Such a long-period grating device generates mode coupling between core-mode light, which propagates while being confined in a core region of the optical waveguide, and cladding-mode light, which also propagates in a cladding region without being confined in the core region, under a predetermined condition. Namely, the long-period grating device converts, of the light in a predetermined wavelength band propagating as core-mode light in the core region, only a wavelength component satisfying a mode-coupling condition into cladding-mode light, while letting the other wavelength components propagate as core-mode light. Thus, the long-period grating device acts as an optical filter (see, for example, A. M. Vengsarkar, et al., "Long-period fiber gratings as band-rejection filters," OFC'95, PD4).

Letting $\beta_{co}$ be the propagation constant of core-mode light, $\beta_{cl}^{(m)}$ be the propagation constant of m-th order cladding-mode light, and $\Lambda$ be the period of refractive index modulation, the mode-coupling condition is represented by the following expression:

$$\beta_{co} - \beta_{cl}^{(m)} = 2\pi/\Lambda. \quad (1)$$

Also, each of propagation constants $\beta_{co}$ and $\beta_{cl}^{(m)}$ is a function of wavelength $\lambda$. When light propagates through an optical waveguide, there are a plurality of cladding-mode light components, whereby the above-mentioned mode-coupling condition is satisfied at a plurality of wavelengths. However, the wavelengths satisfying the above-mentioned mode-coupling condition are discrete and are separate from each other by several tens to several hundreds of nanometers. Therefore, the long-period grating is utilized as an optical filter which selectively attenuates or eliminates a wavelength of core-mode light satisfying the mode-coupling condition.

In order to design a long-period grating which selectively eliminates a desirable wavelength of core-mode light in a wavelength band in use, the respective values of $\beta_{co}$ and $\beta_{cl}^{(m)}$ are initially determined according to the structure of the optical waveguide provided with the long-period grating, so that an appropriate value of period of refractive index modulation (grating period) $\Lambda$ is set. Then, an amplitude mask in which chromium oxide or the like is deposited on an artificial quartz substrate at intervals of the period A and a silica-based optical waveguide whose core region is doped with Ge element are prepared, and the optical waveguide is irradiated with ultraviolet rays by way of the amplitude mask, whereby the long-period grating device is obtained.

SUMMARY OF THE INVENTION

The inventors have studied the above-mentioned conventional art and, as a result, have found the following problem.. Namely, there have been cases where the conventional long-period grating designed and manufactured as mentioned above eliminates not only the desirable wavelength of core-mode light in a wavelength band in use, but also other wavelengths of core-mode light in the wavelength band in use. When such a long-period grating device which cannot yield its designed optical characteristics eliminates not only core-mode light at a wavelength to be eliminated (designed wavelength) but also other wavelengths of core-mode light, then it adversely affects optical communications and the like.

In order to overcome problems such as one mentioned above, it is an object of the present invention to provide a long-period grating device which can eliminate only a desirable wavelength of core-mode light in a wavelength band in use.

The long-period grating device according to the present invention is an optical device, based on an optical waveguide such as an optical fiber, in which a refractive index modulation area with a period $\Lambda$ for mode-coupling a predetermined wavelength of core-mode light to cladding-mode light under a predetermined condition in a wavelength band in use from 1525 nm to 1610 nm, preferably from 1525 nm to 1570 nm, is provided in the optical waveguide.

In the long-period grating device according to the present invention, in particular, the absolute value of a loss peak due to mode coupling concerning a refractive index modulation component with a period $\Lambda/(2n+1)$ (n=1, 2, 3, 4) is 0.2 dB or less in the above-mentioned wavelength band in use.

Since the period $\Lambda$ is set so as to selectively attenuate or eliminate only a desirable wavelength of core-mode light in the wavelength band in use without attenuating other wavelengths of core-mode light, this long-period grating device is favorably utilized in optical communications and the like.

Specifically, letting $\beta_{co,1}$ be the propagation constant of core-mode light at a lower-limit wavelength in the wavelength band in use, $\beta_{co,2}$ be the propagation constant of core-mode light at an upper-limit wavelength in the wavelength band in use, $\beta_{cl,1}^{(m)}$ be the propagation constant of $m(\leq l+1)$-th order cladding-mode light at the lower-limit wavelength, and $\beta_{cl,2}^{(m)}$ be the propagation constant of $m(\leq l+1)$-th order cladding-mode light at the upper-limit wavelength, the above-mentioned period $\Lambda$ is set so as not to exist within the range of at least $(2n+1)\times 2\pi/(\beta_{co,1}-\beta_{cl,1}^{(m)})$ but not greater than $(2n+1)\times 2\pi/(\beta_{co,2}-\beta_{cl,2}^{(m)})$.

In the parameters mentioned above, n is a positive integer of at least 1 but not greater than 4; whereas, letting $\beta_{co,max}$ be the propagation constant of core-mode light at a coupling peak wavelength at which mode coupling between core-mode light and cladding-mode light is maximized in the wavelength band in use, l is the order of cladding-mode light having the propagation constant closest to $\beta_{co,max} - 9 \times 2\pi/\Lambda$ at the coupling peak wavelength.

When the period $\Lambda$ of refractive index modulation is set as mentioned above, the long-period grating device can selectively attenuate or eliminate only a desirable wavelength of core-mode light in the above-mentioned wavelength band in use without attenuating other wavelengths of core-mode light.

Here, as is also explicitly shown in U.S. Pat. No. 5,703, 978, this long-period grating is a grating which induces coupling (mode coupling) between core-mode light and cladding-mode light propagating through an optical transmission line such as an optical fiber, and is clearly distinguished from short-period gratings which reflect light centered at a predetermined wavelength. Also, in order to attain a strong power conversion from core-mode light to cladding-mode light, the grating period (pitch) of the long-period grating is set such that the optical path difference between the core-mode light and the cladding-mode light becomes 2π. Therefore, the long-period grating acts so as to couple the core-mode light to the cladding-mode light, whereby the core-mode light attenuates over a narrow band centered at a predetermined wavelength (loss peak wavelength).

The present invention will be more fully understood from the detailed description given hereinbelow and the accompanying drawings, which are given by way of illustration only and are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will be apparent to those skilled in the art from this detailed description.

BRIEF DESCRIPTION OF THE DRAWINGS

FIGS. 5A and 5B are graphs showing transmission characteristics of a long-period grating device (having a grating length of 20 mm, a period Λ of 475 μm, and a refractive index modulation amplitude of 4.8×10$^{-4}$) prepared as a second comparative example, in which FIG. 5A shows transmissivity concerning a refractive index modulation component with a basic period Λ, whereas FIG. 5B shows transmissivity concerning refractive index modulation components with periods other than the period Λ;

FIGS. 7A and 7B are graphs showing transmission characteristics of a long-period grating device (having a grating length of 20 mm, a period Λ of 403 μm, and a refractive index modulation amplitude of 4.2×10$^{-4}$) prepared as a third comparative example, in which FIG. 7A shows transmissivity concerning a refractive index modulation component with a basic period Λ, whereas FIG. 7B shows transmissivity concerning refractive index modulation components with periods other than the period Λ;

FIGS. 8A and 8B are graphs showing transmission characteristics of a long-period grating device (having a grating length of 20 mm, a period Λ of 341 μm, and a refractive index modulation amplitude of 3.9×10$^{-4}$) prepared as a fourth comparative example, in which FIG. 8A shows transmissivity concerning a refractive index modulation component with a basic period Λ, whereas FIG. 8B shows transmissivity concerning refractive index modulation components with periods other than the period Λ;

DESCRIPTION OF THE PREFERRED EMBODIMENTS

In the following, embodiments of the long-period grating according to the present invention will be explained with reference to FIGS. 1 to 4, 5A, 5B, 6, 7A to 8B, 9, and 10. In the explanation of drawings, constituents identical to each other will be referred to with numerals or letters identical to each other, without repeating their overlapping descriptions.

First, details of how the present invention is conceived will be explained. The mode-coupling condition represented by the above-mentioned expression (1) is based on the assumption that the refractive index modulation of the long-period grating is shaped like a sinusoidal wave with a period Λ. However, the refractive index modulation of the long-period grating formed in an optical waveguide irradiated with ultraviolet rays by way of an amplitude mask looks more like a square wave than a sinusoidal wave. Therefore, it can be seen that, once expanded with Fourier series, the refractive index modulation component of the long-period grating with the period Λ includes not only the sinusoidal wave component of the period Λ but also a refractive index modulation component of the period Λ divided by an odd number, i.e., a sinusoidal wave component of the period Λ/(2n+1). Here, n is a positive integer.

In view of the foregoing, mode coupling also occurs between the core-mode light having a propagation constant $\beta_{co}$ and the m-th order cladding-mode light having a propagation constant $\beta_{cl}^{(m)}$ when a mode-coupling condition represented by the following expression:

$$\beta_{co}-\beta_{cl}^{(m)}=2\pi(2n+1)/\Lambda \qquad (2)$$

is satisfied. Namely, even when a long-period grating device is designed and manufactured according to the mode-coupling condition of the above-mentioned expression (1), there is a possibility that it may also eliminate other wavelengths of core-mode light satisfying the mode-coupling condition of the above-mentioned expression (2). Here, m is also a positive integer.

The present invention is achieved in view of the foregoing consideration.

Figure 1:
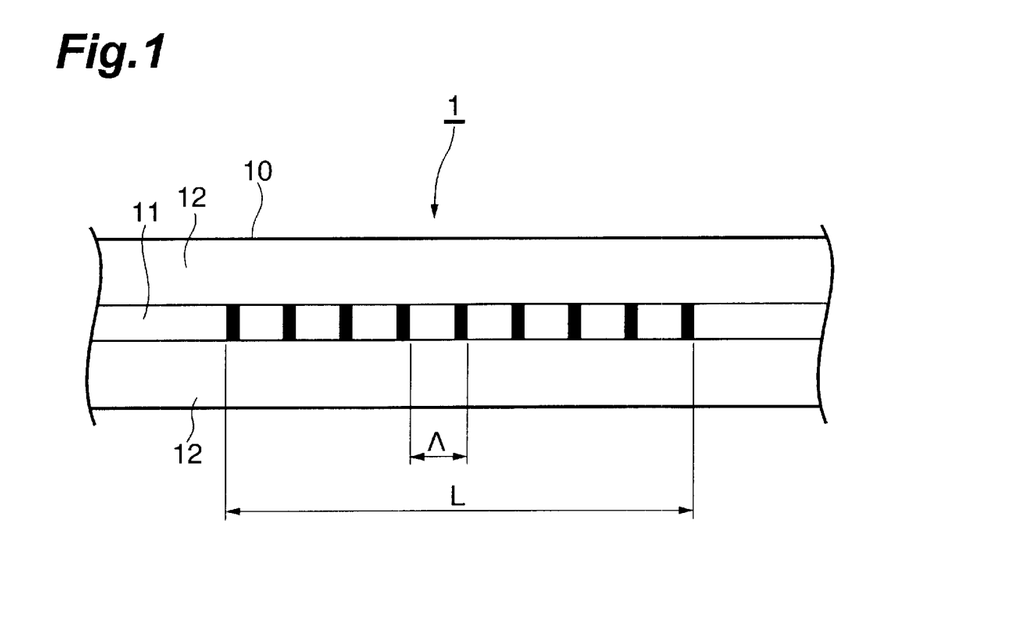
FIG. 1 is a view showing a cross-sectional structure of the long-period grating device according to the present invention.

FIG. 1 is a view showing a cross-sectional structure of the long-period grating device according to the present invention. Though the following explanation relates to a long-period grating device in which a refractive index modulation area with a period Λ is provided in a core region of an optical fiber as shown in FIG. 1, the same applies to a long-period grating device in which a refractive index modulation area with the period Λ is provided in a flat type optical waveguide.

FIG. 1 shows a cross section of a long-period grating device 1 taken along a plane including the optical axis thereof. As depicted, the long-period grating device 1 is obtained when a refractive index modulation area with a period Λ is formed in an optical fiber 10. The optical fiber 10 comprises a core region 11 having a refractive index $n_{co}$; and a cladding region 12, disposed at the outer periphery of the core region 11, having a refractive index $n_{cl}$. Here, $$n_{co} > n_{cl}. \tag{3}$$

The optical fiber 10 is mainly composed of silica glass, whereas the core region 11 is doped with Ge element. For yielding the long-period grating device 1, an amplitude mask in which chromium oxide or the like is deposited on an artificial quartz substrate at intervals of the period Λ is prepared, and the optical fiber 10 is irradiated with ultraviolet rays by way of this amplitude mask. Namely, of the core region 11, the part irradiated with the ultraviolet rays raises its refractive index, and thus formed refractive index modulation area with the period Λ functions as a long-period grating.

Also, the long-period grating device 1 according to this embodiment is designed such that its loss (loss peak) due to mode coupling concerning a refractive index modulation component with a period Λ/(2n+1) with respect to a positive integer n (=1, 2, 3, 4) is 0.2 dB or less in a wavelength band in use (1525 nm to 1610 nm, preferably 1525 nm to 1570 nm). In other words, the long-period grating device 1 according to this embodiment is designed such that no wavelength (loss peak wavelength) satisfying the mode-coupling condition of the above-mentioned expression (2) concerning the refractive index modulation component with the period Λ/(2n+1) exists in the wavelength band in use.

The above-mentioned positive integer n is restricted to 1, 2, 3, and 4 because of the fact that, if n is 5 or greater, then the absolute value of the loss peak concerning the refractive index modulation component with the period Λ/(2n+1) becomes 0.2 dB or less, thereby exerting no influence upon the transmission characteristic of the long-period grating in practice. Namely, assuming that the long-period grating device 1 is utilized for equalizing the gain of an EDFA (erbium-doped fiber amplifier), the long-period grating usually requires a peak loss of greater than 0.8 dB and about 5 dB (about 10 dB even in a special case). On the other hand, the magnitude of loss peak in the long-period grating increases as the grating length L (length of the refractive index modulation area) and the amplitude of refractive index modulation enhance. The amplitude of refractive index modulation component having a period Λ/(2n+1) becomes 1/(2n+1) of that of the refractive index modulation component having a period Λ, whereby the loss peak decreases inevitably. From these facts, it is considered that, if n is 5 or greater, then the absolute value of the loss peak concerning the refractive index modulation component with the period Λ/(2n+1) becomes 0.2 dB or less, thereby exerting no influence upon the transmission characteristic of the long-period grating in practice (where it is specified to be about ±0.1 dB or less at each wavelength with respect to major loss peaks).

Specifically, letting the range from $\lambda_1$ (lower-limit wavelength) to $\lambda_2$ (upper-limit wavelength) be the wavelength band in use, $\beta_{co,1}$ be the propagation constant of core-mode light at the wavelength $\lambda_1$, $\beta_{co,2}$ be the propagation constant of core-mode light at the wavelength $\lambda_2$, $\beta_{cl,1}^{(m)}$ be the propagation constant of m(≦l+1)-th order cladding-mode light at the wavelength $\lambda_1$, and $\beta_{cl,2}^{(m)}$ be the propagation constant of m(≦l+1)-th order cladding-mode light at the wavelength $\lambda_2$, the refractive index modulation period (grating period) Λ is set so as not to exist within the range of at least $(2n+1) \times 2\pi/(\beta_{co,1} - \beta_{cl,1}^{(m)})$ but not greater than $(2n+1) \times 2\pi/(\beta_{co,2} - \beta_{cl,2}^{(m)})$. Here, the order of cladding-mode light is m (≦l+1); and, letting $\beta_{co,max}$ be the propagation constant of core-mode light at a coupling peak wavelength at which mode coupling between core-mode light and cladding-mode light is maximized in the wavelength band in use, l is the order of cladding-mode light having the propagation constant closest to $\beta_{co,max} - 9 \times 2\pi/\Lambda$ at the coupling peak wavelength.

At this time, the long-period grating device 1 according to this embodiment is obtained when the relative refractive index difference Δn of the core region 11 with respect to the cladding region 12, and the cutoff wavelength $\lambda_c$ of the optical fiber 10 is appropriately set. Here, the relative refractive index difference Δn of the core region 11 with respect to the cladding region 12 is given by the following expression (4):

$$\Delta n = (n_{co} - n_{cl})/n_{co}. \tag{4}$$

Results of evaluation of samples of long-period grating devices prepared as prototypes will now be explained.

Figure 2:
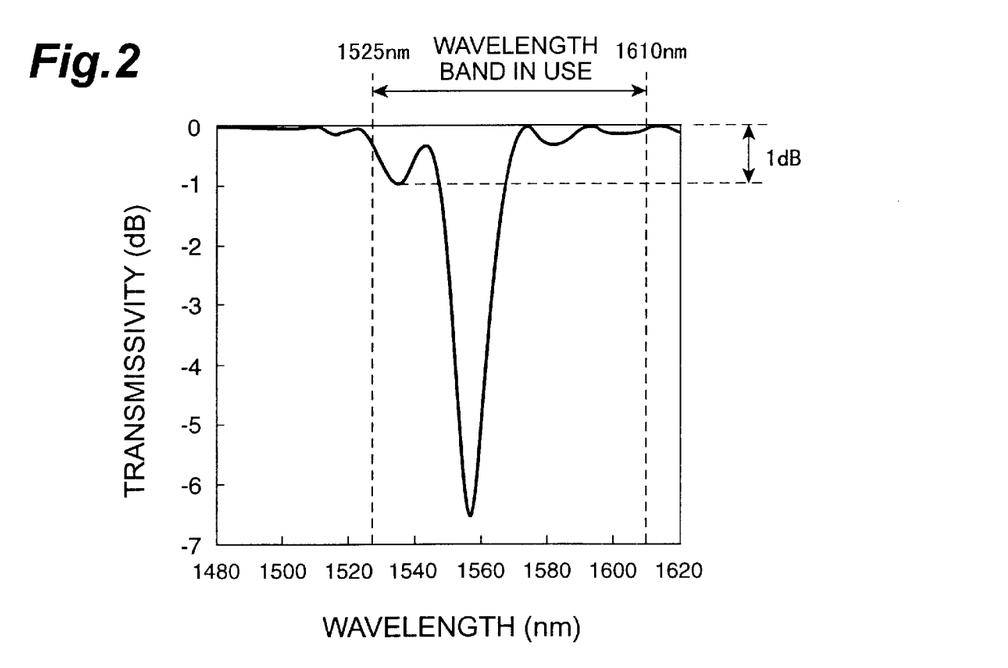
FIG. 2 is a graph showing a transmission characteristic of a long-period grating device prepared as a first comparative example.

The long-period grating device prepared as a first comparative example comprises an optical fiber having a relative refractive index difference Δn of 0.5% and a cutoff wavelength $\lambda_c$ of 0.996 μm, and a refractive index modulation area (long-period grating) formed in a core region of the optical fiber. This long-period grating has a grating length L of 40 mm and a refractive index modulation period (grating period) Λ of 405.5 μm. FIG. 2 is a graph showing a transmission characteristic of the long-period grating device prepared as the first comparative example. As can be seen from this graph, the long-period grating device of the first comparative example mode-couples core-mode light and cladding-mode light not only near a wavelength of 1556 nm (attenuates the core-mode light near the wavelength of 1556 nm) but also near a wavelength of 1534 nm included in a wavelength band in use from 1525 nm to 1610 nm (attenuates the core-mode light near the wavelength of 1534 nm as well). In FIG. 2, the absolute value of a side peak near the wavelength of 1534 nm is about 1 dB.

Figure 3:
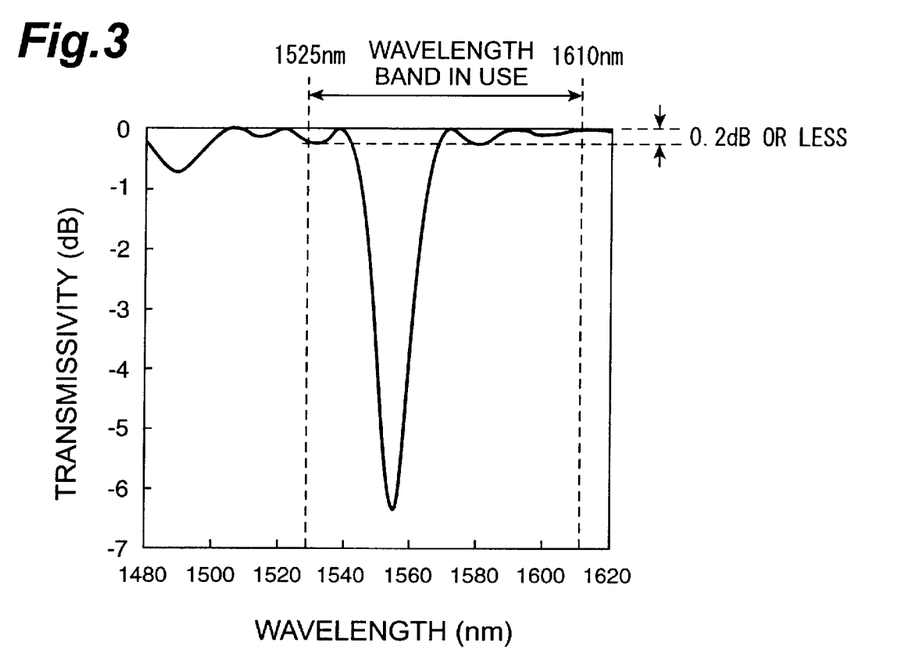
FIG. 3 is a graph showing a transmission characteristic of an example of the long-period grating device according to the present invention.

On the other hand, the long-period grating device prepared as an example of the present invention comprises an optical fiber having a relative refractive index difference Δn of 0.5% and a cutoff wavelength $\lambda_c$ of 0.952 μm, and a refractive index modulation area (long-period grating) formed in a core region of the optical fiber. This long-period grating has a grating length L of 40 mm and a refractive index modulation period (grating period) Λ of 412.0 μm. FIG. 3 is a graph showing a transmission characteristic of the long-period grating device according to this example. As can be seen from this graph, the long-period grating device of this example mode-couples core-mode light and cladding-mode light not only near a wavelength of 1.556 μm (attenuates the core-mode light near the wavelength of 1.556 μm) but also near a wavelength of 1490 nm. Here, the wavelength of 1490 nm where a side peak exists is outside the wavelength band (1525 nm to 1610 nm), in which the propagation loss in the optical fiber is low, generally used in optical communications (i.e., it is far from the wavelength of 1556 nm). Namely, the long-period grating device according to this embodiment can suppress the absolute value of the loss peak concerning a refractive index modulation component with a period Λ/(2n+1) to 0.2 dB or less in a wavelength band of 1525 nm to 1610 nm in use, thereby being able to effectively suppress the occurrence of side peaks which affect optical communications and the like in the wavelength band in use.

Figure 4:
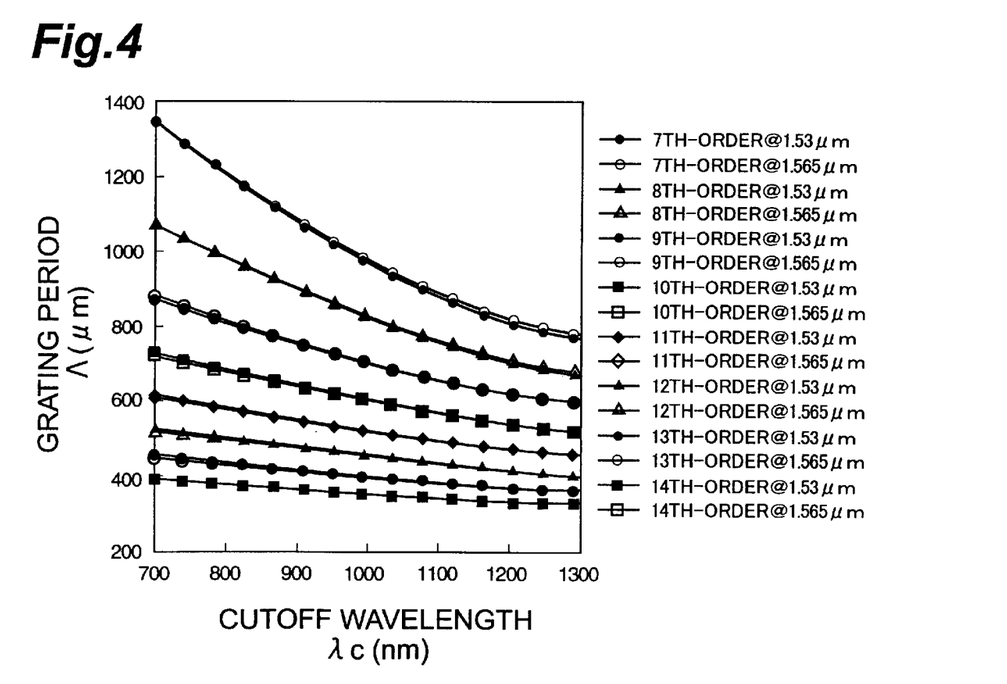
FIG. 4 is a graph showing periods Λ at which the coupling wavelength (loss peak wavelength) concerning a refractive index modulation component with a period Λ/3 in a long-period grating becomes 1.530 μm or 1.565 μm.

FIG. 4 is a graph showing periods Λ at which the coupling wavelength (loss peak wavelength) concerning a refractive index modulation component with a period Λ/3 in a long-period grating becomes 1530 nm or 1565 nm. This graph shows the relationship between the cutoff wavelength $\lambda_c$ of the optical fiber and the period Λ at each order (m=7 to 14) of cladding-mode light coupling to core-mode light. In the optical fiber prepared for measurement, the relative refractive index difference Δn of the core region with respect to the cladding region is 0.5%. This graph only takes account of the refractive index modulation component with the period Λ/3, which is the most influential upon the transmission characteristic. As can be seen from this graph, if the refractive index modulation period Λ is set appropriately according to the cutoff wavelength $\lambda_c$ of the optical fiber, then the mode coupling concerning the refractive index modulation component with the period Λ/3 can be kept from occurring in a wavelength band in use, or the absolute value of the loss peak due to this mode coupling can be suppressed to a practically unproblematic level (e.g., 0.2 dB or less).

Results of measurement concerning individual samples of long-period grating devices in which the refractive index modulation period Λ is changed arbitrarily as comparative examples will now be explained.

Figure 5A:
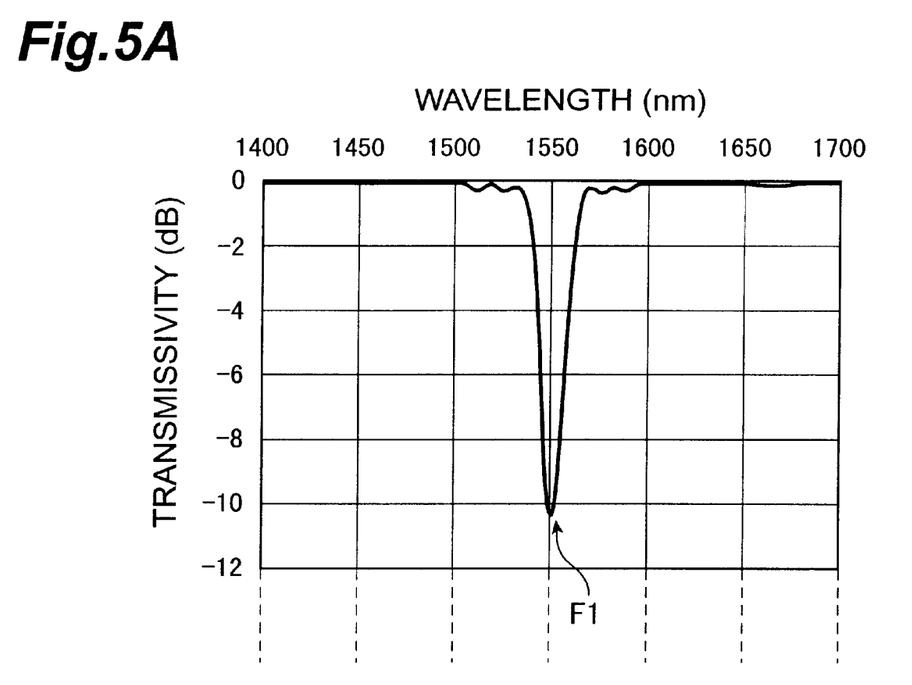
Figure 5B:
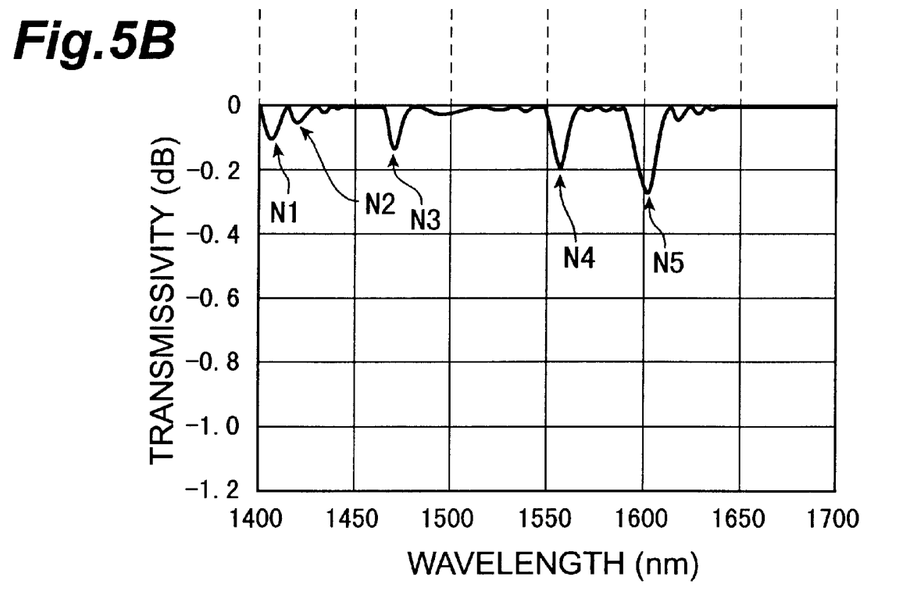

FIGS. 5A and 5B are graphs showing transmission characteristics of a long-period grating device prepared as a second comparative example, in which FIG. 5A shows transmissivity concerning a refractive index modulation component with a basic period Λ, whereas FIG. 5B shows transmissivity concerning refractive index modulation components with periods other than the period Λ. In this second comparative example, the grating length L is 20 mm, the refractive index modulation period Λ is 475 μm, and the refractive index modulation amplitude is 4.8×10⁻⁴. In FIG. 5A, F1 indicates the loss peak due to mode coupling to the 4th-order cladding-mode light concerning the refractive index modulation component with the basic period Λ. In FIG. 5B, N1 indicates the loss peak due to mode coupling to the 11th-order cladding-mode light concerning a refractive index modulation component with a period Λ/3 other than the basic period, N2 indicates the loss peak due to mode coupling to the 16th-order cladding-mode light concerning a refractive index modulation component with a period Λ/5 other than the basic period, N3 indicates the loss peak due to mode coupling to the 25th-order cladding-mode light concerning a refractive index modulation component with a period Λ/11 other than the basic period, N4 indicates the loss peak due to mode coupling to the 22nd-order cladding-mode light concerning a refractive index modulation component with a period Λ/9 other than the basic period, and N5 indicates the loss peak due to mode coupling to the 19th-order cladding-mode light concerning a refractive index modulation component with a period Λ/7 other than the basic period.

In the long-period grating device according to the present invention, letting $\beta_{co,1}$ be the propagation constant of core-mode light at a lower-limit wavelength in the wavelength band in use, $\beta_{co,2}$ be the propagation constant of core-mode light at an upper-limit wavelength in the wavelength band in use, $\beta_{cl,1}^{(m)}$ be the propagation constant of m(≦l+1)-th order cladding-mode light at the lower-limit wavelength, and $\beta_{cl,2}^{(m)}$ be the propagation constant of m(≦l+1)-th order cladding-mode light at the upper-limit wavelength, the above-mentioned period Λ is set so as not to exist within the range of at least $(2n+1)\times 2\pi/(\beta_{co,1}-\beta_{cl,1}^{(m)})$ but not greater than $(2n+1)\times 2\pi/(\beta_{co,2}-\beta_{cl,2}^{(m)})$. In the parameters mentioned above, n is a positive integer of at least 1 but not greater than 4; whereas, letting $\beta_{co,max}$ be the propagation constant of core-mode light at a coupling peak wavelength at which mode coupling between core-mode light and cladding-mode light is maximized in the wavelength band in use, l is the order of cladding-mode light having the propagation constant closest to $\beta_{co,max}-9\times 2\pi/\Lambda$ at the coupling peak wavelength.

Here, letting $\beta_{cl}^{(m)}$ be the propagation constant of m-th order cladding-mode light at which the mode coupling with core-mode light is maximized at the loss peak wavelength (wavelength to be actually attenuated), and $\beta_{co,max}$ be the propagation constant of the core-mode light, $$\beta_{co,max}-\beta_{cl}^{(m)}=2\pi/\Lambda \qquad (5)$$

holds in a long-period grating with a refractive index modulation period (grating period) Λ due to phase matching. On the other hand, assuming that the m-th order cladding-mode light satisfying a phase-matching condition with (or mode-coupling with) core-mode light concerning a refractive index modulation component with a period Λ/(2n+1) at the same wavelength exists, the propagation constant of the cladding-mode light must satisfy $$\beta_{co,max}-\beta_{cl}^{(m)}=(2n+1)\times 2\pi/\Lambda \qquad (6)$$

at this wavelength. Since the maximum value of the positive integer n is 4 as mentioned above, $$\beta_{cl}^{(m)}=\beta_{co,max}-9\times 2\pi/\Lambda \qquad (7)$$

is obtained from the above-mentioned expression (6). Letting l be the order of cladding-mode light having the propagation constant closest to that given by expression (7), there are at most two cladding-mode light components causing mode coupling with core-mode light concerning a refractive index modulation component of the same period in a wavelength band of about 100 nm from 1520 nm to 1620 nm, whereby it will be sufficient if the order m of cladding mode at the upper-limit wavelength and lower-limit wavelength in the wavelength band in use is restricted to l+1 or less.

Figure 6:
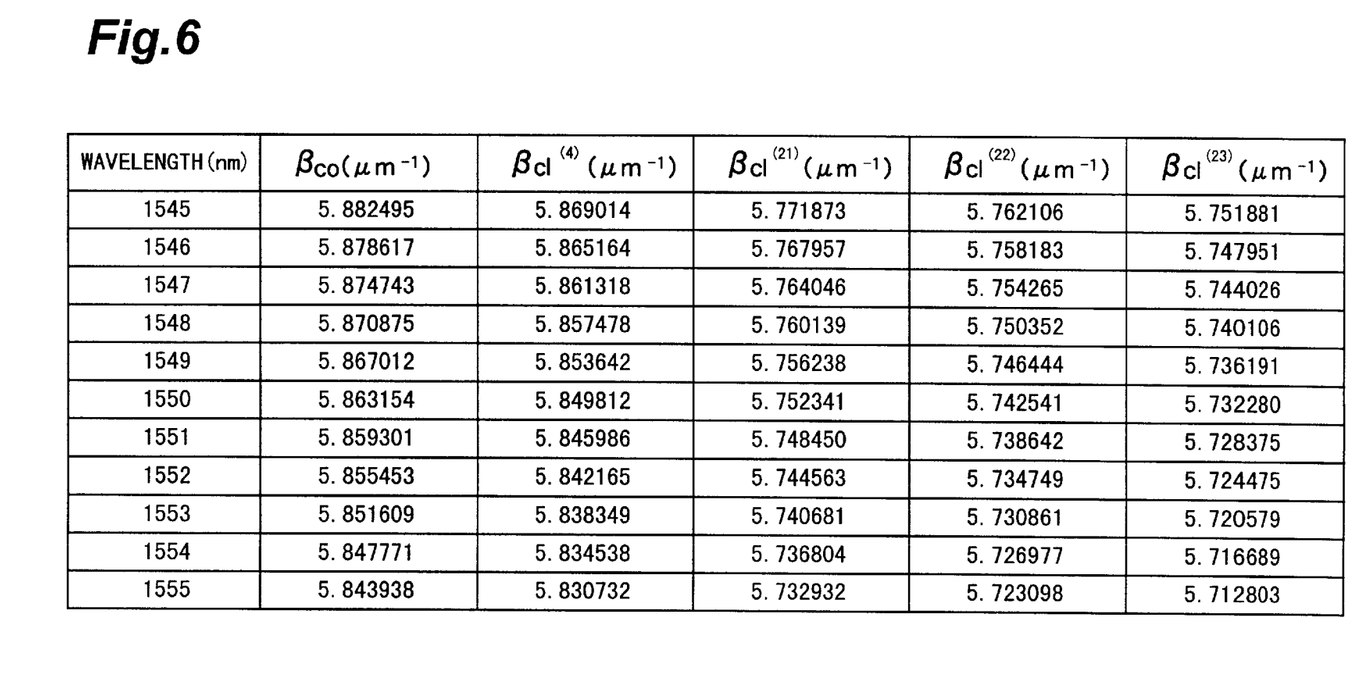
FIG. 6 is a table showing respective propagation constants of core-mode light and cladding-mode light at individual wavelengths in the long-period grating device having the transmission characteristics shown in FIGS. 5A and 5B.

In the case of the long-period grating device having the transmission characteristics shown in FIGS. 5A and 5B, propagation constants of core-mode light and cladding-mode light at individual wavelengths can specifically be calculated as shown in FIG. 6. For example, at a loss peak wavelength of 1549 nm due to mode coupling from core-mode light to the 4th-order cladding-mode light, $\beta_{cl}^{(m)}$ in the above-mentioned expression (7) is calculated as 5.746696. Since the order of cladding-mode light having the propagation constant closest to this value is 22, it can be seen that, for setting the refractive index modulation period Λ, it will be sufficient if up to the 23rd (=22+1) order of cladding-mode light is taken into consideration.

Figure 7A:
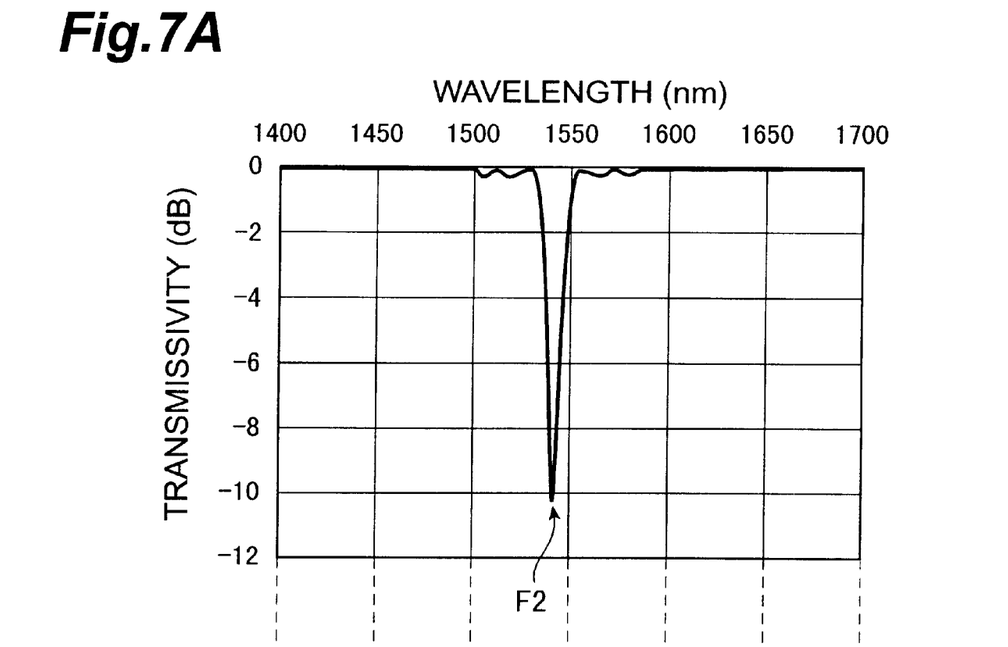
Figure 7B:
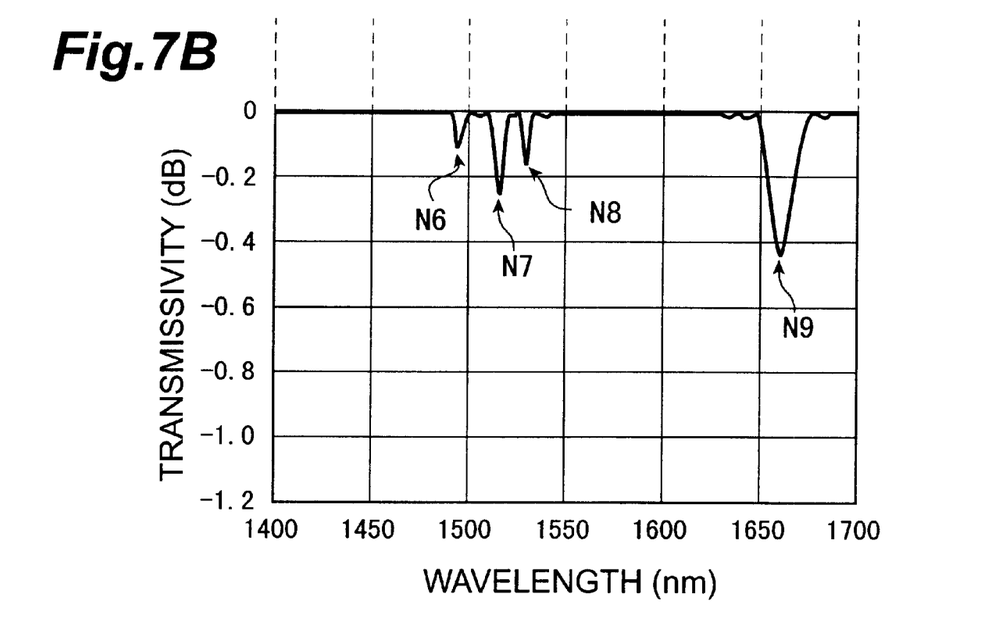

FIGS. 7A and 7B are graphs showing transmission characteristics of a long-period grating device prepared as a third comparative example, in which FIG. 7A shows transmissivity concerning the refractive index modulation component with a basic period Λ, whereas FIG. 7B shows transmissivity concerning refractive index modulation components with periods other than the period Λ. In this third comparative example, the grating length L is 20 mm, the refractive index modulation period Λ is 403 μm, and the refractive index modulation amplitude is 4.2×10⁻⁴. In FIG. 7A, F2 indicates the loss peak due to mode coupling to the 5th-order cladding-mode light concerning a refractive index modulation component with the basic period Λ. In FIG. 7B, N6 indicates the loss peak due to mode coupling to the 27th-order cladding-mode light concerning a refractive index modulation component with a period Λ/11 other than the basic period, N7 indicates the loss peak due to mode coupling to the 21st-order cladding-mode light concerning a refractive index modulation component with a period Λ/7 other than the basic period, N8 indicates the loss peak due to mode coupling to the 24th-order cladding-mode light concerning a refractive index modulation component with a period Λ/9 other than the basic period, and N9 indicates the loss-peak due to mode coupling to the 17th-order cladding-mode light concerning a refractive index modulation component with a period Λ/5 other than the basic period.

Figure 8A:
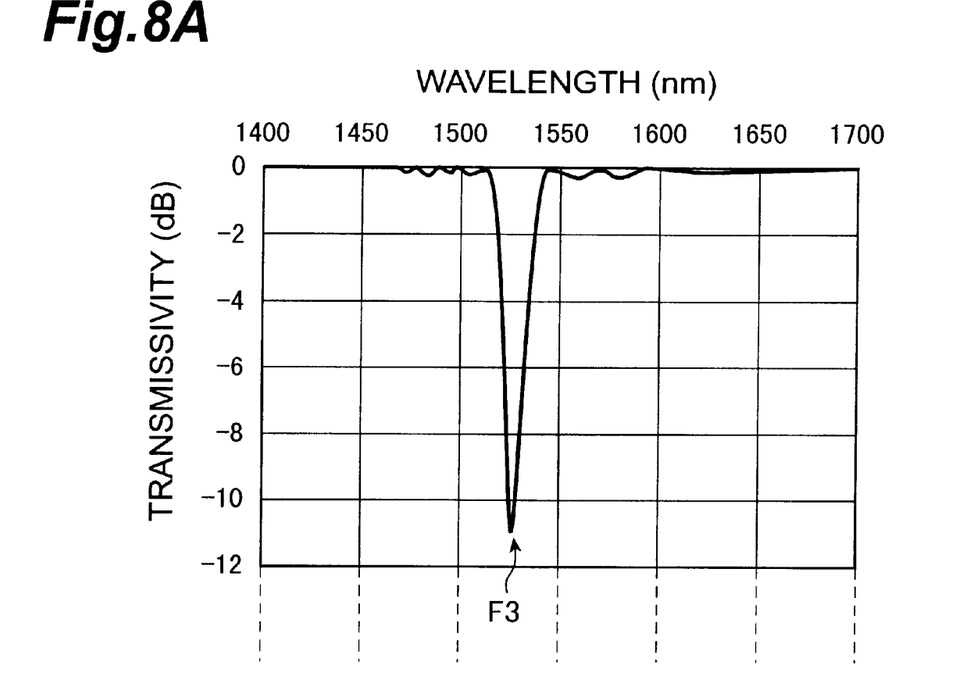
Figure 8B:
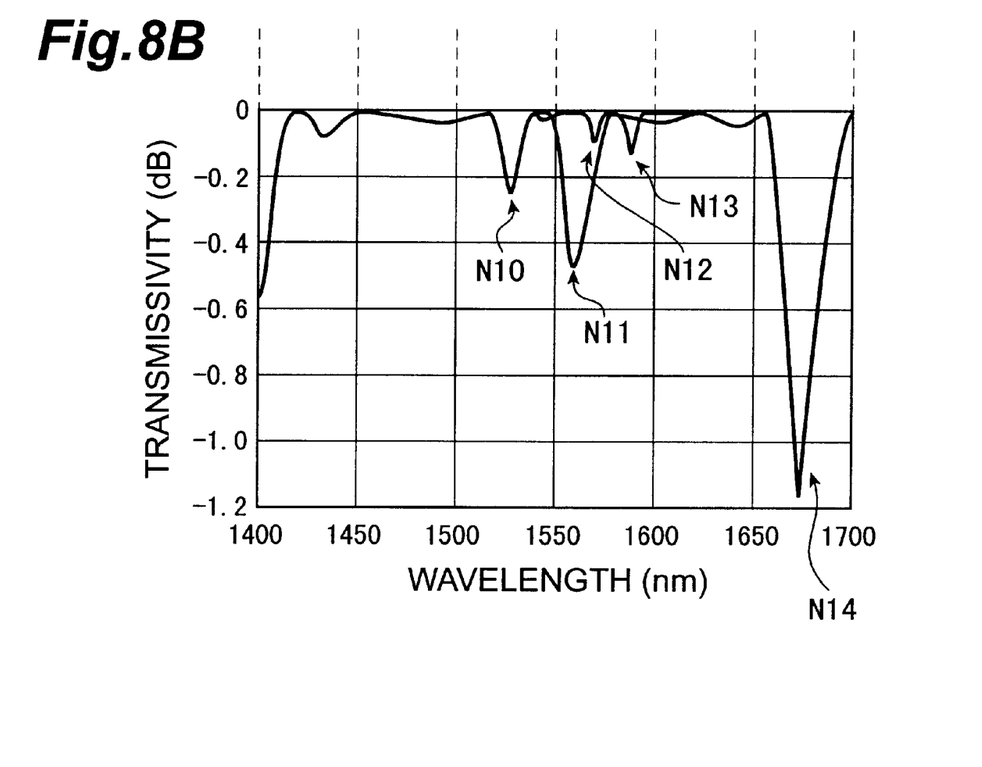

Further, FIGS. 8A and 8B are graphs showing transmission characteristics of a long-period grating device prepared as a fourth comparative example, in which FIG. 8A shows transmissivity concerning a refractive index modulation component with a basic period Λ, whereas FIG. 8B shows transmissivity concerning refractive index modulation components with periods other than the period Λ. In this fourth comparative example, the grating length L is 20 mm, the refractive index modulation period Λ is 341 μm, and the refractive index modulation amplitude is $3.9 \times 10^{-4}$. In FIG. 8A, F3 indicates the loss peak due to mode coupling to the 6th-order cladding-mode light concerning the refractive index modulation component with the basic period Λ. In FIG. 8B, N10 indicates the loss peak due to mode coupling to the 23rd-order cladding-mode light concerning a refractive index modulation component with a period Λ/7 other than the basic period, N11 indicates the loss peak due to mode coupling to the 19th-order cladding-mode light concerning a refractive index modulation component with a period Λ/5 other than the basic period, N12 indicates the loss peak due to mode coupling to the 27th-order cladding-mode light concerning a refractive index modulation component with a period Λ/11 other than the basic period, N13 indicates the loss peak due to mode coupling to the 25th-order cladding-mode light concerning a refractive index modulation component with a period Λ/9 other than the basic period, and N14 indicates the loss peak due to mode coupling to the 14th-order cladding-mode light concerning a refractive index modulation component with a period Λ/3 other than the basic period.

It can be seen that loss peaks concerning refractive index modulation components with a period Λ/(2n+1) (n=1, 2, 3, 4) exist in a wavelength band of 1525 nm to 1610 nm in use in each of the above-mentioned first to fourth comparative examples.

Another example of the long-period grating according to the present invention will now be explained. The example having the transmission characteristic shown in FIG. 3 is one in which the structural parameters and grating period of an optical fiber to be formed with a long-period grating are adjusted as compared with the long-period grating device having the transmission characteristic shown in FIG. 2, such that the coupling peak (side peak indicating a loss at a wavelength of 1490 nm) concerning a refractive index modulation component with a period Λ/3 occurs outside the wavelength band in use. The example explained in the following comprises an optical fiber having a structure similar to that of the optical fiber formed with a long-period grating having the above-mentioned transmission characteristic shown in FIG. 3. The long-period grating device according to this example is designed such that only the period of refractive index modulation (long-period grating) differs from that of the example shown in FIG. 3, whereby the coupling peak concerning a refractive index modulation component with a period Λ/(2n+1) exists outside the wavelength band in use.

Figure 9:
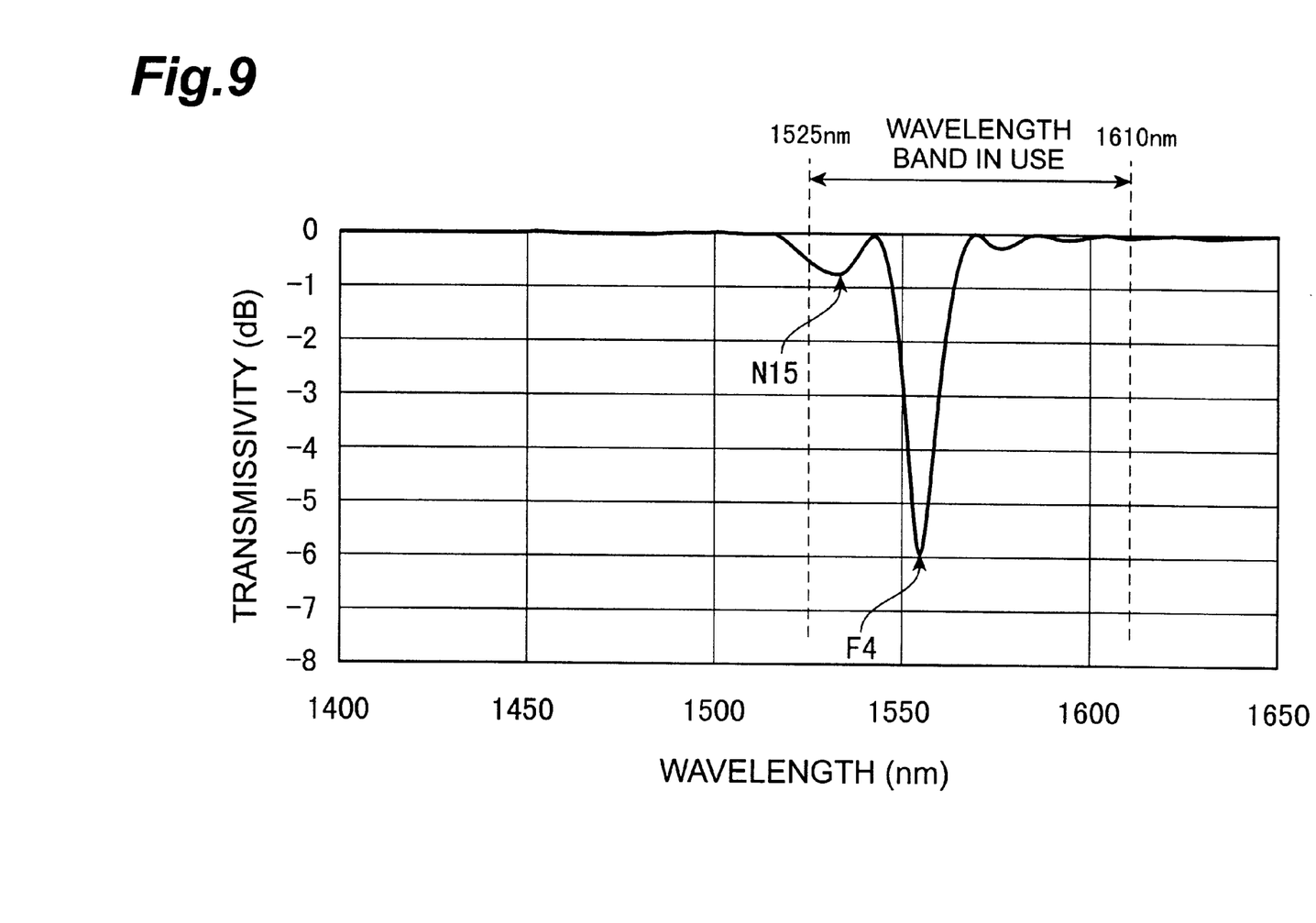
FIG. 9 is a graph showing a transmission characteristic of a long-period grating device in which a loss peak concerning a refractive index modulation component with a period Λ/3 exists within a wavelength band in use.

FIG. 9 is a graph showing, as a comparative example for the long-period grating device according to the example mentioned above, a transmission characteristic of a long-period grating device in which a loss peak concerning a refractive index modulation component with a period Λ/3 exists in a wavelength band in use. In the optical fiber formed with this long-period grating, the relative refractive index difference Δn of the core region with respect to the cladding region is 0.55%, and the cutoff wavelength is 966 μm. Target optical characteristics are such that, in a wavelength band of 1525 nm to 1610 nm in use, the loss peak wavelength is 1555 nm and the absolute value of loss peak is 6 dB.

In addition to the designing conditions mentioned above, the long-period grating device of FIG. 9 has a refractive index modulation period Λ of 408 μm, and a loss peak at a wavelength of 1555 nm due to mode coupling between core-mode light at this wavelength and the 6th-order cladding-mode light. In the case of this comparative example, as can be seen from FIG. 9, there is a loss peak concerning a refractive index modulation component with a period Λ/3 at a wavelength of 1530 nm (a coupling peak between core-mode light at this wavelength and the 13th-order cladding-mode light), whereby a loss of about 0.7 dB is generated due to the existence of this loss peak. In FIG. 9, F4 is the loss peak due to mode coupling to the 6th-order cladding-mode light concerning the refractive index modulation component with the period Λ, whereas N15 is the loss peak (side peak) due to mode coupling to the 13th-order cladding-mode light concerning the refractive index modulation component with the period Λ/3.

Figure 10:
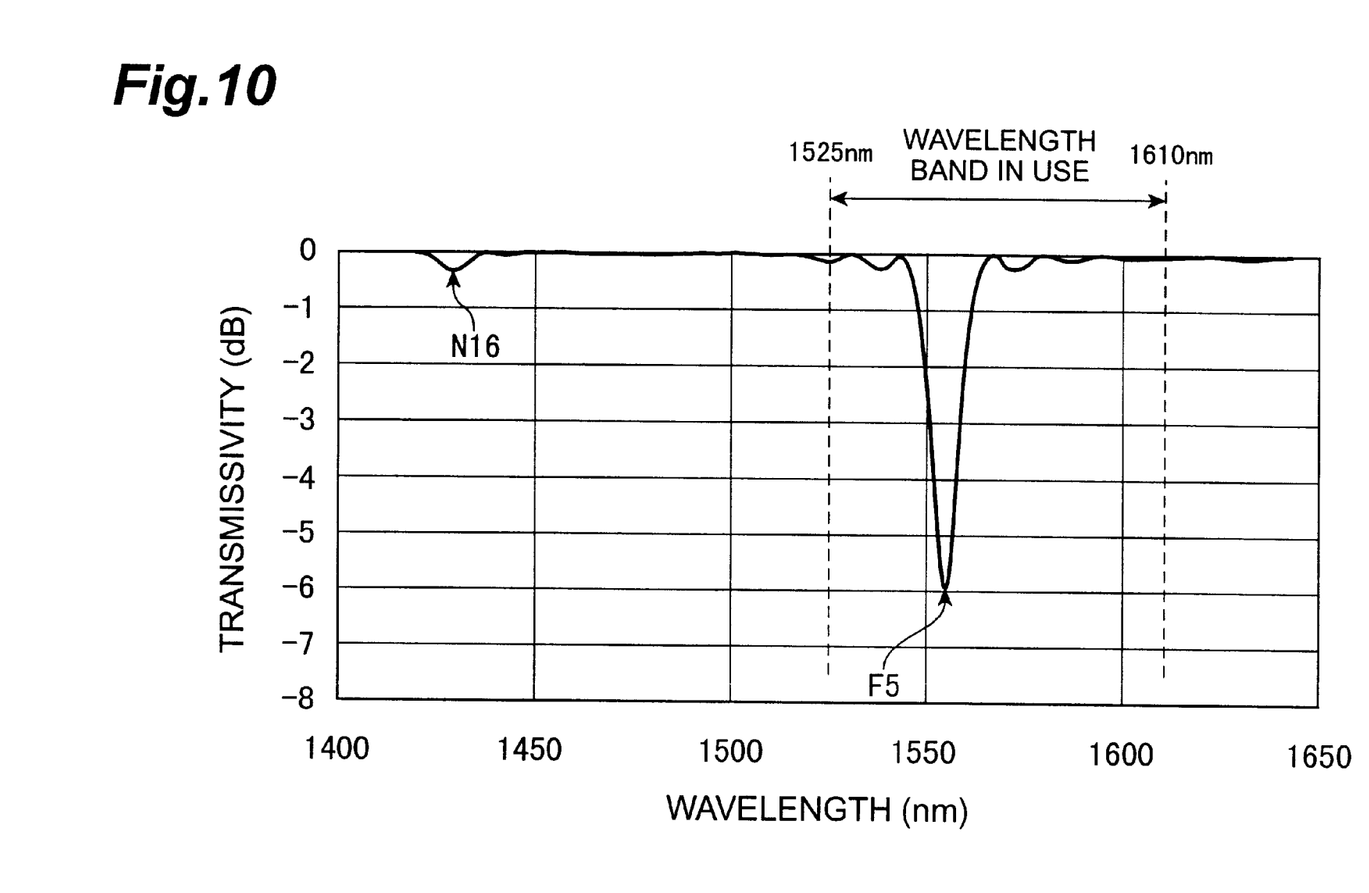
FIG. 10 is a graph showing a transmission characteristic of an example of the long-period grating according to the present invention in which a period Λ is set such that no loss peak concerning a refractive index modulation component with a period Λ/(2n+1) exists within a wavelength band in use.

On the other hand, FIG. 10 is a graph showing a transmission characteristic of the above-mentioned example of the long-period grating according to the present invention in which the period Λ is set such that no loss peak concerning the refractive index modulation component with the period Λ/(2n+1) exists within the wavelength band in use. The designing conditions of the long-period grating device according to this example are identical to those of the above-mentioned comparative example (FIG. 9) except that the refractive index modulation period Λ is set to 492 μm, and that the loss peak at a wavelength of 1555 nm is one caused by mode coupling between core-mode light at this wavelength and the 5th-order cladding-mode light.

As can be seen from FIG. 10, thus designed long-period grating device according to this example has such a transmission characteristic that only one loss peak F5 exceeding 0.2 dB exists in a wavelength band of 1525 nm to 1610 nm in use. Though a side peak N16 exists near a wavelength of 1430 nm, the loss wavelength of this side peak N16 is clearly outside the set wavelength band in use and thus can be neglected. It can be seen from FIGS. 9 and 10 that the setting of refractive index modulation period is important for controlling a wavelength band (which is preferably outside the wavelength band in use) where a side peak N16 occurs.

Since the refractive index modulation period is set such that the absolute value of the loss peak due to mode coupling concerning a refractive index modulation component with a period Λ/(2n+1) (n=1, 2, 3, 4) is suppressed to 0.2 dB or less in a wavelength band in use, as explained in the foregoing, the long-period grating of the present invention can selectively attenuate or eliminate only a desirable wavelength of core-mode light in the wavelength band in use without attenuating core-mode light having wavelengths other than the desirable wavelength. Therefore, this long-period grating can suitably be utilized in optical communications and the like.

From the invention thus described, it will be obvious that the invention may be varied in many ways. Such variations are not to be regarded as a departure from the spirit and scope of the invention, and all such modifications as would be obvious to one skilled in the art are intended for inclusion within the scope of the following claims.

What is claimed is:

1. A long-period grating device in which a refractive index modulation area with a period $\Lambda$ for mode-coupling a predetermined wavelength of core-mode light to cladding-mode light under a predetermined condition in a wavelength band having a range 1525 nm to 1610 nm is provided in an optical waveguide;

wherein a loss peak due to mode coupling concerning a refractive index modulation component with a period $\Lambda/(2n+1)$ (n=1, 2, 3, 4) is 0.2 dB or less in said wavelength band in use.

2. A long-period grating according to claim 1, wherein, letting $\beta_{co,1}$ be a propagation constant of core-mode light at a lower-limit wavelength in said wavelength band in use, $\beta_{co,2}$ be a propagation constant of core-mode light at an upper-limit wavelength in said wavelength band in use, $\beta_{cl,1}^{(m)}$ be a propagation constant of m($\leq$l+1)-th order cladding-mode light at said lower-limit wavelength, and $\beta_{cl,2}^{(m)}$ be a propagation constant of m($\leq$l+1)-th order cladding-mode light at said upper-limit wavelength, said period $\Lambda$ is set so as not to exist within the range of at least $(2n+1)\times2\pi/(\beta_{co,1}-\beta_{cl,1}^{(m)})$ but not greater than $(2n+1)\times2\pi/(\beta_{co,2}-\beta_{cl,2}^{(m)})$, where, letting $\beta_{co,max}$ be a propagation constant of core-mode light at a coupling peak wavelength at which mode coupling between core-mode light and-cladding-mode light is maximized in said wavelength band in use, l is the order of cladding-mode light having the propagation constant closest to $\beta_{co,max}-9\times2\pi/\Lambda$ at said coupling peak wavelength.

* * * * *